(12) United States Patent
Forsthoevel et al.

(10) Patent No.: US 9,399,534 B2
(45) Date of Patent: Jul. 26, 2016

(54) PLASTIC CONTAINER HAVING GRIPPING GROOVE

(75) Inventors: Jochen Forsthoevel, Regensburg (DE); Christian Stoiber, Michelsneukirchen (DE)

(73) Assignee: KRONES AG (DE)

(*) Notice: Subject to any disclaimer, the term of this patent is extended or adjusted under 35 U.S.C. 154(b) by 597 days.

(21) Appl. No.: 12/665,911

(22) PCT Filed: Jul. 16, 2008

(86) PCT No.: PCT/EP2008/059264
§ 371 (c)(1),
(2), (4) Date: Feb. 25, 2010

(87) PCT Pub. No.: WO2009/010520
PCT Pub. Date: Jan. 22, 2009

(65) Prior Publication Data
US 2010/0178148 A1    Jul. 15, 2010

(30) Foreign Application Priority Data

Jul. 17, 2007 (DE) .......................... 10 2007 033 621

(51) Int. Cl.
*B65D 1/02*  (2006.01)
*B29B 11/14*  (2006.01)
(Continued)

(52) U.S. Cl.
CPC ................ *B65D 1/023* (2013.01); *B29B 11/14* (2013.01); *B29C 49/0073* (2013.01); *B29B 11/08* (2013.01); *B29B 2911/1402* (2013.01);
(Continued)

(58) Field of Classification Search
CPC ............... B65D 1/023; B29C 49/0073; B29B 2911/14333; B29B 2911/14633; B29B 2911/14133; B29B 11/14; B29B 2911/1444
USPC .................... 215/252, 255, 354, 44, 349, 296
See application file for complete search history.

(56) References Cited

U.S. PATENT DOCUMENTS 2,025,406 A    12/1935  Whelan ........................... 215/31
4,147,268 A *   4/1979  Patel et al. ..................... 215/252
(Continued)

FOREIGN PATENT DOCUMENTS

AT        5071       3/2002   ............. B29B 11/14
DE     2061936       6/1972   ............. B65D 41/04
(Continued)

OTHER PUBLICATIONS

International Search Report received in Applicants' underlying PCT Application Serial No. PCT/EP2008/059264.
(Continued)

*Primary Examiner* — Stephen Castellano
(74) *Attorney, Agent, or Firm* — Hayes Soloway P.C.

(57) ABSTRACT

A container has a base body and a thread which includes an at least partially circumferential securing ring which extends essentially radially outwards relative to the base body of the container. The circumferential securing ring is arranged between the thread and the base body in a longitudinal direction (L) of the container and is spaced apart from the thread in the longitudinal direction (L) of the container The container has an at least partially circumferential groove between the thread and the circumferential securing ring, which groove has a smaller external cross-section than the securing ring and a smaller external cross-section than the thread.

26 Claims, 2 Drawing Sheets

(51) Int. Cl.
*B29C 49/00* (2006.01)
*B29B 11/08* (2006.01)
*B29C 49/06* (2006.01)
*B29C 49/42* (2006.01)
*B29K 67/00* (2006.01)
*B29K 105/00* (2006.01)

(52) U.S. Cl.
CPC .......... *B29B 2911/1404* (2013.01); *B29B 2911/14026* (2013.01); *B29B 2911/14033* (2013.01); *B29B 2911/1434* (2013.01); *B29B 2911/1442* (2013.01); *B29B 2911/1444* (2013.01); *B29B 2911/14106* (2013.01); *B29B 2911/14133* (2013.01); *B29B 2911/14326* (2013.01); *B29B 2911/14333* (2013.01); *B29B 2911/14606* (2013.01); *B29B 2911/14633* (2013.01); *B29C 49/06* (2013.01); *B29C 49/4205* (2013.01); *B29K 2067/00* (2013.01); *B29K 2105/258* (2013.01)

(56) References Cited

U.S. PATENT DOCUMENTS

| | | | | |
|---|---|---|---|---|
| 4,299,328 | A * | 11/1981 | Ochs et al. | 215/252 |
| 4,418,828 | A * | 12/1983 | Wilde et al. | 215/252 |
| 4,432,461 | A * | 2/1984 | Mumford et al. | 215/252 |
| 4,461,391 | A * | 7/1984 | Davis | 215/252 |
| 4,473,163 | A * | 9/1984 | Geiger | 215/250 |
| 4,530,438 | A * | 7/1985 | McDevitt | 215/252 |
| 4,555,039 | A * | 11/1985 | Conti | 215/252 |
| 4,567,993 | A * | 2/1986 | Albrecht et al. | 215/252 |
| 4,579,241 | A * | 4/1986 | Hayes | 215/252 |
| 4,592,475 | A * | 6/1986 | Hannon et al. | 215/252 |
| 4,628,669 | A * | 12/1986 | Herron et al. | 53/425 |
| 4,645,088 | A | 2/1987 | Menichetti | 215/329 |
| 4,756,438 | A * | 7/1988 | Ryder | 215/252 |
| 4,813,557 | A * | 3/1989 | Herron et al. | 215/329 |
| 4,818,212 | A | 4/1989 | Gibbemeyer | 425/529 |
| 5,020,683 | A * | 6/1991 | Strassheimer | 215/354 |
| 5,054,268 | A * | 10/1991 | Hayes et al. | 53/490 |
| 5,137,163 | A * | 8/1992 | Moore | 215/252 |
| 5,145,078 | A * | 9/1992 | Hannon et al. | 215/252 |
| 5,244,107 | A * | 9/1993 | Battegazzore | 215/252 |
| 5,488,888 | A * | 2/1996 | Kowal | 83/880 |
| 5,520,877 | A * | 5/1996 | Collette et al. | 264/521 |
| 5,755,347 | A * | 5/1998 | Ingram | 215/252 |
| 5,950,850 | A * | 9/1999 | Takamatsu et al. | 215/252 |
| 6,044,995 | A * | 4/2000 | Dai | 215/354 |
| 6,302,172 | B1 | 10/2001 | DeVillele | 141/372 |
| 6,325,227 | B1 * | 12/2001 | Ekkert | 215/252 |
| 6,382,444 | B1 * | 5/2002 | Nyman | 215/252 |
| 6,981,600 | B1 * | 1/2006 | Battegazzore | 215/252 |
| 7,516,861 | B2 * | 4/2009 | Itou et al. | 215/44 |
| 7,735,664 | B1 * | 6/2010 | Peters et al. | 215/44 |
| 8,091,724 | B2 * | 1/2012 | King | 220/296 |
| 2002/0090473 | A1 * | 7/2002 | Lee | B29C 45/1684 428/35.7 |
| 2002/0134747 | A1 * | 9/2002 | Babcock et al. | 215/252 |
| 2002/0182351 | A1 * | 12/2002 | Akiyama | B29B 11/06 428/35.7 |
| 2003/0001311 | A1 * | 1/2003 | Collette et al. | 264/255 |
| 2003/0098286 | A1 * | 5/2003 | Bloom et al. | 215/349 |
| 2005/0087508 | A1 | 4/2005 | Browne | 215/249 |
| 2005/0263476 | A1 * | 12/2005 | Harrison et al. | 215/44 |

FOREIGN PATENT DOCUMENTS

| | | | | |
|---|---|---|---|---|
| DE | 199 24 827 | | 10/2000 | ............. B29C 45/26 |
| DE | 10 2005 051735 | | 5/2007 | ............. B65D 1/02 |
| DE | 10 2006 012020 | | 9/2007 | ............. B65G 47/90 |
| DE | 102007002596 | | 7/2008 | ............. B65D 1/02 |
| FR | 2 791 337 | | 9/2000 | ............. B67C 3/24 |
| WO | WO 02/090220 | | 11/2002 | |
| WO | WO2006018660 | | 2/2006 | ............. B65D 39/08 |
| WO | WO 2007/104503 | | 9/2007 | ............. B67C 7/00 |

OTHER PUBLICATIONS

Canadian Office Action issued in related application No. 2,691,726, dated Nov. 6, 2013 (3 pgs).

European Patent Register Communication of Opposition Proceedings listing of Documents, retrieved May 14, 2014 (6 pages).

D8: Entgegenhaltung Punkt 1 mit Zeichnung 07340,00,AG,00 und Abbildung einer nach dieser Zeichnung hergestellten Flasche, sowie Ausschnittsvergrosserung aus dieser Zeichnung (2 Seiten)Trans: Citation 1 point with drawing 07340.00, AG, and Figure 00 a bottle prepared according to this drawing, as well as Ausschnittsvergrosserung from this drafting (2 pgs).

D9: Zeichnung 2389_2 der Formenbau Schmitz aus 2001/2002 (1 Seite)Trans: 2389_2 drawing the mold Schmitz from 2001/2002 (1 pg).

D10: Zeichnung 6883,00,AG,05 der SIG Corpoblast aus 2006 (1 Seite)Trans: Drawing 6883.00, Inc., 05 the SIG Corpoplast from 2006 (1 pg).

D11: Zeichnung mit der Nummer 2842707 der Firma Husky aus dem Jahr 2004 (1 Seite)Trans: Drawing with No. 2842707 of Husky's 2004 (1pg).

D12: Zeichnungsausschnitte aus der Zeichnung D-01-13403-B der Silgan Plastics Corporation aus 2003 (1 Seite)Trans: Drawing sections of the drawing D-01-13403-B of Silgan Plastics Corporation from 2003 (1 pg).

D13: Zeichnungsausschnitte aus der Zeichnung 07269,00,AG,01 der SIG Corpoplast aus Feb. 2007 (1 Seite) Trans: Drawing sections of the drawing 07269,00, 01 the SIG Corpoplast from Feb. 2007 (1 pg).

D14: Zeichnungsausschnitte aus der Zeichnung 07270,00,AG,03 der SIG Corpoplast aus Feb./Apr. 2007 (1 Seite) Trans: Drawing sections of the drawing 07270,00, Inc., 03 the SIG Corpoplast from Feb./Apr. 2007 (1 pg).

D15: Zeichnung 06419,00,AG,02 der SIG Corpoplast aus 2005 und Vergrosserung zu VIEW A and VIEW B (2 Seiten)Trans:Drawing 06419.00, Inc., 02 the SIG Corpoplast from 2005 to enlarment VIEW A VIEW B and (2 pgs).

D16: Zeichnung 06517,00, AG, 00 der SIG Corpoplast aus 2005 und Vergrosserung zu DETAIL B (2 Seiten) Trans: Drawing 06517.00, AG, 00 of the SIG Corpoplast from 2005 to enlargement DETAIL B (2 pgs).

D17: Zeichnung 06419,00,AG,01 der SIG Corpoplast aus 2005 (1 Seite) Trans: Drawing 06419.00, Inc., the SIG Corpoplast from 2005 (1 pg).

Canadian Office Action issued in related application No. 2,691,726, dated Aug. 6, 2014 (3 pgs).

European Reason of Rejection issued in related application No. 08786163.9, dated Oct. 4, 2013 (136 pgs).

European Reason of Rejection issued in related application No. 08786163.9, dated Oct. 24, 2013 (52 pgs).

Extract of the Design Guide "Engineering Polymers—Part and Mold Design—Thermoplastics", Copyright© 2000, Bayer Corporation (4 pgs).

Extract of the book "Plastic Injection Molding: Material Selection and Product Design Fundamentals", Copyright© 1997 by Douglas M. Bryce and Society of Manufacturing Engineers (6 pgs).

Article with title "5 Rules of Problem-Free Injection Molding", by Katrina C. Arabe, published on Aug. 8, 2002 (8 pgs).

* cited by examiner

PLASTIC CONTAINER HAVING GRIPPING GROOVE

This application in the national stage (Rule 371) of PCT/EP2008/059264 filed Jul. 16, 2008.

BACKGROUND OF THE INVENTION

The present invention relates to a plastic container and in particular a plastic container for storing beverages. Plastic bottles, such as PET bottles for example, have recently proved to be increasingly more popular on the market than glass bottles. During the production of these bottles, so-called preforms are heated and are expanded within a mould, for example using air pressure.

In order to be able to treat the individual containers or preforms, in the prior art these have a collar which is usually circumferential. This collar is used in order to be able to grip the container for example by means of a gripping arm and to transfer it to another gripping arm. In general therefore, this collar, which will hereinafter also be referred to as the carrying ring, is used for handling the bottle. Usually a handover takes place from one clamp which grips the container to the next clamp, wherein one clamp grips below this carrying ring and one clamp grips above this carrying ring between the carrying ring and a securing ring which is usually arranged above the carrying ring. This securing ring is designed to be much smaller than the carrying ring and also to use less material.

This carrying ring, which is usually also visible even on the finished product, thus serves exclusively for the process of manufacturing the containers/the product. On the other hand, this carrying ring also requires a considerable quantity of plastic material. Care must be taken to ensure that a preform remains unstretched in the region in which this carrying ring is arranged and thus a large quantity of material remains in the carrying ring. The object of the present invention is therefore to provide a container which allows a greater saving in terms of material and in particular to provide a container which does not require the aforementioned carrying ring.

At the same time, however, the intention is also to prevent a clamp from engaging directly in the thread of the containers in order to produce these containers, since this thread might otherwise be destroyed or else a correct fit of the gripping clamps might not be ensured.

SUMMARY OF THE INVENTION

A container according to the invention comprises a base body and a thread. Also provided is an at least partially circumferential securing ring which extends outwards relative to the base body of the container, wherein the at least partially circumferential securing ring is arranged between the thread and the base body in a longitudinal direction of the container and is spaced apart from the thread in the longitudinal direction of the container. According to the invention, the container comprises an at least partially circumferential groove between the base body and the circumferential securing ring, wherein this groove has a smaller external cross-section than the securing ring and a smaller external cross-section than the thread. The securing ring preferably extends essentially radially outwards. However, it would also be possible that the ring is arranged diagonally relative to the radial direction.

The container is for example a preform which can be expanded to form a plastic container. The securing ring preferably serves at the same time to open a seal of the bottle closure during an opening of the bottle.

In the embodiment according to the invention, therefore, the groove is formed as a groove both relative to the thread and also relative to the securing ring, that is to say the groove has an outer circumference which is smaller than all the regions of the thread, i.e. both the thread turn and a thread core to which this thread turn is attached.

By providing this groove, it is possible that a specially adapted engagement means can engage in this groove in order to transport the container or in general to treat the container, and that by virtue of this engagement the thread itself is not damaged. More specifically, it is preferably possible that an engagement means bears against the thread core from below and thus the thread turn itself is not touched.

The object according to the invention is also achieved in that, according to the invention, besides the securing ring, no further radially outwardly pointing collar is provided below the thread.

In particular, in both variants according to the invention, the carrying ring can be omitted.

The container according to the invention is therefore configured in such a way that it can be gripped by different gripping devices at different levels in the longitudinal direction of the container, without the thread itself being touched or damaged. As in the prior art, therefore, a gripping device will likewise engage below the securing ring. However, damage to the thread is avoided. The groove also means that the container is gripped at a precisely defined height. If, on the other hand, an engagement in the thread were to take place, the precise height section of the region in which engagement takes place would be undefined, since it would also depend on the angular position of the preform or of the bottle, because in this case the thread turns or the end sections thereof would also play a role. The position of the container or of the preform would therefore be undefined, since this would depend on the rotational position of the container about the longitudinal axis.

In a further advantageous embodiment, an additional ring could also be provided which disappears below a bottle closure in the closed state of the container. A suitable gripping clamp could in this case engage between this additional ring and the securing ring, and the groove would be formed between these two rings. In this way, however, possibly the region responsible for the function of the closure system would be impaired.

The invention is therefore based on the fundamental concept that the closure-sensitive region does not include any additional geometries, that is to say rings which protrude outwards, but rather a groove which points radially inwards relative to the container is provided.

In a further preferred embodiment, the at least partially and preferably fully circumferential groove directly adjoins the circumferential securing ring in the longitudinal direction of the container. In this embodiment, a side face of this securing ring is at the same time a boundary wall of the groove. In this way, the dimensions of the overall container can be shortened.

In a further advantageous embodiment, the groove has boundary walls which run at least partially in a straight line. By virtue of this embodiment, a very precise engagement of an engagement means in this groove and thus a very stable holding of the container in the gripping devices is possible.

In a further advantageous embodiment, the height of the groove in the longitudinal direction of the container and the length of the circumferential securing ring in the longitudinal direction of the container differ from one another by no more than 100%, preferably by no more than 50%, preferably by no more than 25% and particularly preferably by no more than 10%. The groove and the securing ring are therefore of roughly equal dimensions in terms of their respective extension in the longitudinal direction of the container. This is advantageous since the gripping tools can be configured with correspondingly identical dimensions and/or shaped elements.

In a further advantageous embodiment, the circumferential securing ring comprises a section extending radially outwards in a straight line and a section which adjoins said section and which runs obliquely downwards in the longitudinal direction of the container. In this way, a further saving in terms of material is possible. By virtue of these oblique surfaces, a centring effect is obtained during the engagement of the gripping tools in the groove.

In a further advantageous embodiment, the length of the first section and the depth of the groove differ from one another by no more than 50%, preferably by no more than 25%, preferably by no more than 10% and particularly preferably by no more than 5%. These two sizes preferably correspond to one another. Also by virtue of this procedure, standardised tools can particularly advantageously be used for transporting the container.

In a further advantageous embodiment, the container is made from a plastic and particularly preferably from PET.

Preferably, the base body has a cross-section which widens at least partially towards the circumferential securing ring in the longitudinal direction of the container.

Advantageously, the inner wall of the container has above the circumferential securing ring a section which particularly preferably widens conically towards the thread. Since the described groove is also directed inwards, preferably the internal diameter of the preform is also reduced at this point, so that sufficient wall thickness exists for an injection moulding process and also the stability of the mouth piece is retained. The internal diameter of the container is reduced, as mentioned above, at the level of the securing ring, which is advantageous due to the problems of closing and of gripping below the securing strip with the closing claws of the closure.

The shoulder which advantageously results within the mouth piece can advantageously be used for example for sealing the blowing nozzle during the blowing process. Alternatively, however, a sealing against the mouth rim is also possible for example for a blowing process. A double sealing on the mouth rim and on the aforementioned shoulder is also conceivable.

In a further advantageous embodiment, the container is an expandable container and in particular a preform.

The present invention also relates to a method for transporting a container of the type described above, wherein the container is gripped below the securing ring by a first gripping device and is gripped by a second gripping device at least partially at or in the circumferential groove. It is thus possible by virtue of the method according to the invention to transport the containers within a two-stage process, that is to say to transfer the container from one clamp (gripping device) to another and at the same time to omit the carrying ring which is customary in the prior art, at the same time avoiding damage to the container or to the thread by the individual clamps.

The present invention also relates to an apparatus for transporting containers of the type described above. This apparatus comprises at least a first gripping device which grips the containers at a first predefined region of the containers and at least a second gripping device which grips the containers at a second region of the containers which is different from the first region. According to the invention, the first gripping device is configured in such a way that it grips the container below the securing ring and the second gripping device is configured in such a way that it grips the container above the securing ring and at least also in the groove of the container.

The present invention also relates to an arrangement for containers with an apparatus of the type described above.

Further advantages and embodiments will emerge from the appended drawings:

BRIEF DESCRIPTION OF THE DRAWINGS

In the drawings:

FIG. 1b shows a cross-sectional view of the container of FIG. 1a;

FIG. 2b shows a plan view of the relationship of FIG. 2a;

FIG. 2c shows a cross-sectional view of the container of FIG. 2a; and

DETAILED DESCRIPTION OF THE INVENTION

Figure 1A:
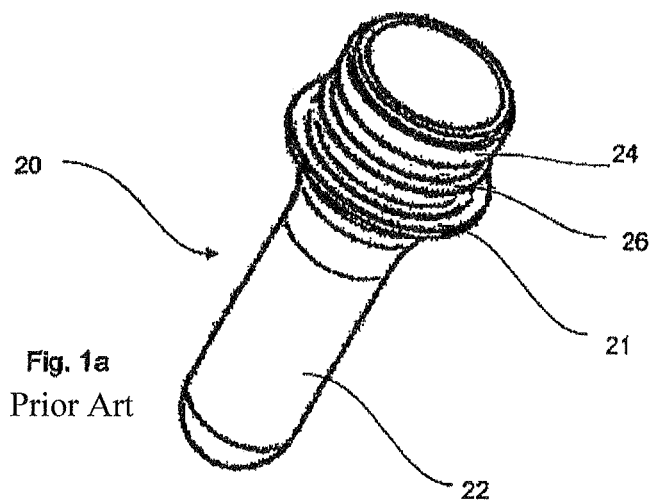
FIG. 1a shows a container according to the prior art.

FIG. 1a shows a perspective view of a container 20 according to the prior art. This container 20 comprises a base body 22 and a thread 24. A carrying ring 21 and a securing ring 26 are provided between this thread 24 and the base body 22. During the production process, this container 20 is expanded to form a plastic bottle, but the shape including the carrying ring 21 and above the carrying ring 21 is retained during the expansion process. It can be seen that the carrying ring 21 protrudes radially outwards to a considerable extent and thus a large quantity of material is required for this carrying ring.

Figure 1B:
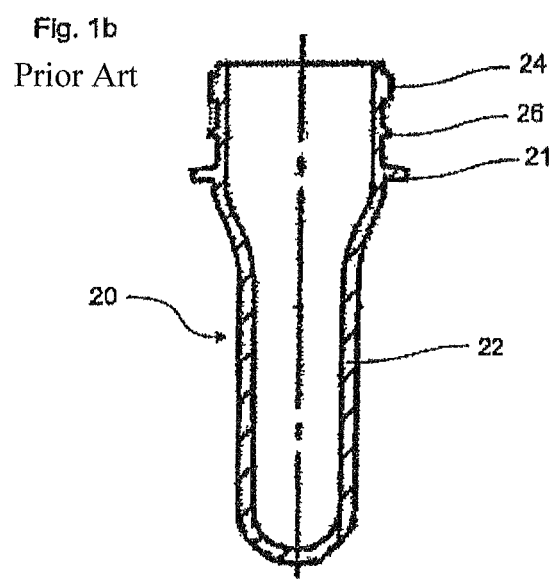

FIG. 1b shows a cross-sectional view of the container 20 shown in FIG. 1a. Since this container is conveyed by a plurality of gripping clamps in a two-stage process, it is possible that a certain gripping clamp engages below the carrying ring 21 and another gripping clamp engages between the lower carrying ring 21 and the securing ring 26. In this way, an engagement in the thread 24 can be avoided and the latter can be treated with care.

Figure 2A:
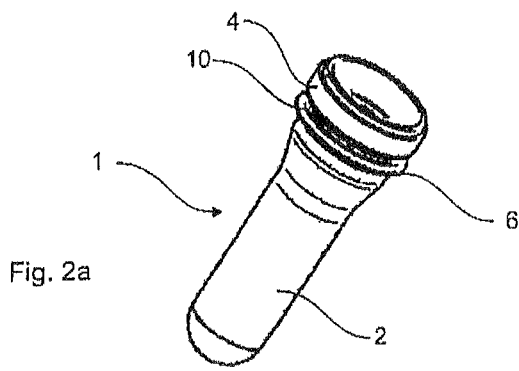
FIG. 2a shows a perspective view of a container according to the invention.

FIG. 2a shows a perspective view of a container 1 according to the invention. This container 1 likewise comprises an expandable base body 2 and a thread 4 (not shown in detail). However, according to the invention, next to the securing ring 6, a groove 10 which serves as an aid for a gripping device is provided between the thread 4. It is thus possible, in the embodiment according to the invention, to omit the need for a carrying ring as in the prior art. It is pointed out that this groove 10 in FIG. 2a is circumferential, but it is also possible to provide a partially interrupted groove. This groove 10 means that the closure-sensitive region of the thread is not touched during the production process and in particular is not touched radially from outside, and therefore deformations of this region are avoided. It is pointed out that in principle any customary container and in particular any customary mouth piece can be modified by the principle according to the invention. This means that the screw closures freely available on the market can also be applied to the container according to the invention.

Figures 2B, 2C:
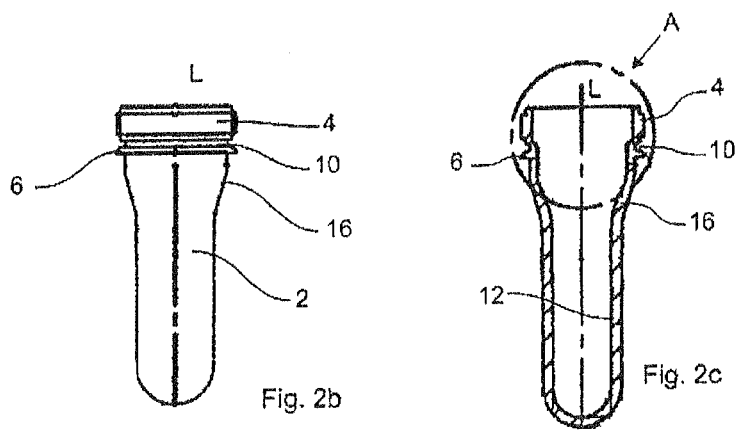

FIG. 2b shows a plan view of the container shown in FIG. 2a. It is possible to see clearly here the groove 10 which is arranged between the securing ring 6 and the thread 4. However, the thread 4 is shown only schematically here. On a closed bottle, the securing ring 6 is also concealed by the corresponding closure.

In the diagram shown in FIG. 2c, reference 12 denotes an inner wall of the container. As mentioned above, the base body 2 is expanded during the production process.

Figure 2D:
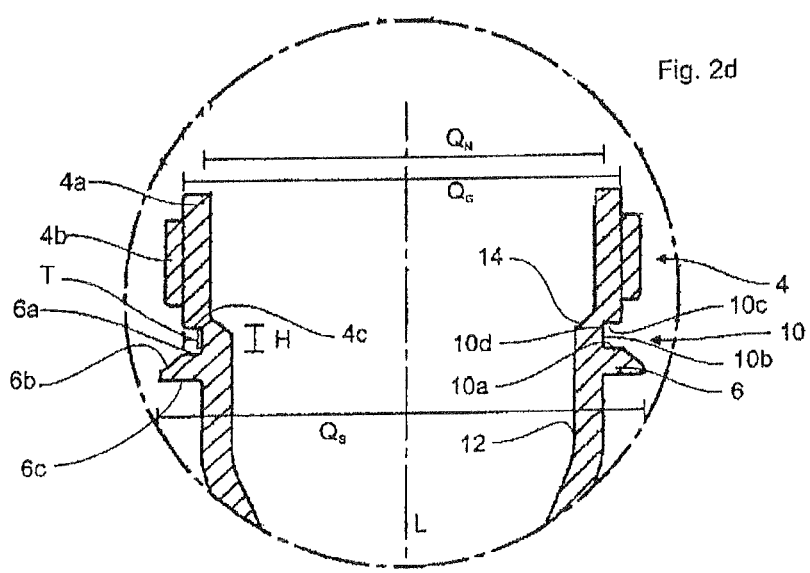
FIG. 2d shows an enlarged view of a top region of the container of FIG. 2c.

FIG. 2d shows a detailed view of the region A shown in FIG. 2c. It can be seen here that the groove 10 is formed relative to the securing ring 6 and the thread 4. This securing ring 6 has an upper section 6a running radially outwards, a lower section 6c running radially outwards, and an obliquely running section 6b. The section 6a which runs radially outwards is at the same time also a boundary wall 10a of the groove 10. This means that the depth T of this groove 10 is determined by the length of this section 6a running in a straight line. A further boundary wall 10c is defined by an underside 4c of the thread. In order to transport the containers, a gripping device can engage in this groove 10 and thus direct contact with the thread turn 4b is prevented. Reference 4a denotes a thread core. In the embodiment shown in FIG. 2d, therefore, the height H of the groove 10 extends from the end of the thread 4 to the securing ring 6. This is at the same time also the maximum height H of this groove 10. The boundary wall 10b of the groove runs essentially in the longitudinal direction L of the container 1.

Reference 14 denotes an oblique section of the container inner wall 12. More specifically, the internal diameter of the container is reduced in the region in which the groove is provided, in order to have a sufficient wall thickness in all regions of the container 1. However, the oblique section 14 could also be offset slightly upwards or downwards in the longitudinal direction L of the container 1. The wall thickness of the container 1 below the securing ring 6 is preferably between 1.5 mm and 5 mm, preferably between 2 mm and 4 mm and particularly preferably approximately 3 mm. Due to the aforementioned oblique section 14, the wall thickness even in the thinnest regions is at least 1 mm, preferably at least 1.5 mm and particularly preferably at least 2 mm. The groove 10 is thus in particular formed also relative to the core 4a of the thread 4.

The depth T of the circumferential groove depends on the basis of the minimum acceptable internal diameter of the mouth piece. The groove 10 should in particular be selected to be large enough and deep enough to ensure reliable functioning of the clamp systems used. Due to the fact that the carrying ring is omitted according to the invention, in some cases the problem may arise that also there is no longer any carrying ring which protects the securing strip of a bottle closure against being engaged from below. In this way, manipulations on this securing strip could be made easier. In order to continue to retain this security, it would be possible to provide the closed mouth piece with a sleeve or to arrange a sheath around the container. More specifically, a shrink-fit sheath could be arranged over the closure or the top of the bottle.

Reference $Q_G$ denotes the external diameter or the external cross-section of the thread 4, reference $Q_S$ denotes the external diameter or the external cross-section of the securing ring 6 and reference $Q_N$ denotes the external diameter or the external cross-section of the groove 10. It can be seen that the external cross-section $Q_N$ of the groove 10 is smaller than the external cross-sections $Q_G$ and $Q_S$ of the thread 4 and of the securing ring 6.

In a method according to the invention for transporting the container shown in FIGS. 2a to 2d, a first gripping device engages below the securing ring 6 and can transfer the container for example to another gripping device which engages in the groove 10. An apparatus according to the invention for transporting such containers may be used for example in blowing machines, labelling machines, filling machines, heating devices for the containers and the like. As shown in FIG. 2c, the base body also has a tapering region 16. On the container 1 according to the invention, this tapering may be less pronounced than on containers according to the prior art, since a tapering already takes place in the upper section 14. Preferably, the container tapers in the section 16 by between 1.5 and 3.0 mm, preferably between 2.0 and 2.7 mm.

All of the features disclosed in the application documents are claimed as essential to the invention in so far as they are novel individually or in combination with respect to the prior art.

The invention claimed is:

1. A plastic container preform comprising a base body formed of a single material, a closure region including a threaded region having a minimum diameter and a thread extending outwardly from a minimum diameter surface, and an at least partially circumferential securing ring which extends outwards relative to the base body of the container, wherein the circumferential securing ring is arranged between the thread and the base body in a longitudinal direction (L) of the preform and is spaced apart from the thread in the longitudinal direction (L) of the preform, wherein the preform comprises an at least partially circumferential groove between one portion of the minimum diameter surface and portions of the minimum diameter surface extending to either side of the thread and the circumferential securing ring, wherein a side wall of the securing ring forms a boundary wall of the circumferential groove, wherein the circumferential groove has a minimum diameter less than the securing ring and less than said one portion of the minimum diameter surface, wherein the preform has a constant interior diameter adjacent a level of the thread, wherein an internal diameter of the container preform is reduced at a level of the circumferential groove and at the level of the circumferential securing ring, wherein the preform interior wall has below the circumferential securing ring a section that has a constant diameter, wherein the thread is an outer thread, wherein the base body has an internal diameter which widens at a point adjacent the circumferential groove as one progresses longitudinally upward from the circumferential securing ring, and wherein, besides the securing ring, no further ring exists between the thread and the securing ring.

2. The preform according to claim 1, wherein the circumferential groove directly adjoins the circumferential securing ring in the longitudinal direction (L).

3. The preform according to claim 1, wherein the circumferential groove has boundary walls which run at least partially in a straight line.

4. The preform according to claim 1, wherein a height (H) of the circumferential groove in the longitudinal direction (L) of the preform and the length of the circumferential securing ring in the longitudinal direction (L) of the preform differ from one another by no more than 100%.

5. The preform according to claim 1, wherein the circumferential securing ring comprises a section extending radially outwards in a straight line and a section running obliquely downwards in the longitudinal direction (L) of the preform.

6. The preform according to claim 5, wherein a length of a first section of the circumferential groove and a depth (T) of the circumferential groove differ from one another by no more than 50%.

7. The preform according to claim 5, wherein a length of a first section of the circumferential groove and the depth (T) of the circumferential groove differ from one another by no more than 50%.

8. The preform according to claim 5, wherein a length of a first section of the circumferential groove and the depth (T) of the circumferential groove differ from one another by no more than 10%.

9. The preform according to claim 5, wherein a length of a first section of the circumferential groove and the depth (T) of the circumferential groove differ from one another by no more than 5%.

10. The preform according to claim 1, wherein the preform is an expandable preform.

11. The preform according to claim 1, formed in two or more parts.

12. A method of use comprising:
(a) providing a container according to claim 1;
(b) gripping the container below the securing ring by a first gripping device;
(c) gripping the container at least partially at the at least partially circumferential groove by a second gripping device; and
(d) transporting the container.

13. An apparatus comprising:
(a) a container according to claim 1;
(b) a first gripping device which grips the container at a first predefined region of the container; and
(c) at least a second gripping device which grips the container at a second region of the container which is different from the first region, wherein the first gripping device is configured in such a way that it grips the container below the securing ring and the second gripping device is configured in such a way that it grips the container above the securing ring in the groove of the container, wherein the apparatus transports the container.

14. The preform according to claim 1, formed of PET.

15. The preform according to claim 1, wherein a carrying ring for the preform is omitted.

16. The preform according to claim 1, wherein a height of the circumferential groove extends from the end of the thread to the securing ring.

17. The preform according to claim 1, wherein the circumferential groove has a smaller external cross-section than a core of the thread.

18. The preform according to claim 1, wherein a boundary wall of the circumferential groove runs in the longitudinal direction of the preform.

19. The preform according to claim 1, wherein a wall thickness of the preform below the securing ring is between 2 mm and 5 mm.

20. The preform according to claim 1, wherein a height (H) of the circumferential groove in the longitudinal direction (L) of the preform and the length of the circumferential securing ring in the longitudinal direction (L) of the preform differ from one another by no more than 50%.

21. The preform according to claim 1, wherein a height (H) of the circumferential groove in the longitudinal direction (L) of the preform and the length of the circumferential securing ring in the longitudinal direction (L) of the preform differ from one another by no more than 25%.

22. The preform according to claim 1, wherein a height (H) of the circumferential groove in the longitudinal direction (L) of the preform and the length of the circumferential securing ring in the longitudinal direction (L) of the preform differ from one another by no more than 10%.

23. The preform according to claim 1, wherein an inner wall of the preform has above the circumferential securing ring and extending upwards from a level of the circumferential groove, a section which widens conically towards the thread.

24. The preform according to claim 1, wherein the circumferential groove comprises an indentation having a reduced diameter forming a step wise diameter reduction between the thread and the circumferential securing ring.

25. The preform according to the claim 1, wherein the interior diameter of the preform is reduced at the level of the circumferential groove and at the level of the circumferential securing ring in the longitudinal direction downwards beginning from the securing circumferential ring, and
the base body has a cross-section which widens at least partially towards the constant diameter section below the circumferential securing ring in the longitudinal direction adjacent the circumferential securing ring upwards in direction of the circumferential securing ring.

26. A plastic container preform comprising a base body formed of a single material, a closure region including a threaded region having a minimum diameter and a thread extending outwardly from a minimum diameter surface, and an at least partially circumferential securing ring which extends outwards relative to the base body of the preform, wherein the circumferential securing ring is arranged between the thread and the base body in the longitudinal direction (L) of the preform and is spaced apart from the thread and the base body in a longitudinal direction (L) of the preform, wherein the preform comprises an at least partially circumferential groove between one portion for the minimum diameter surface and portions of the minimum diameter surface extending to either side of the thread and the circumferential securing ring, wherein the circumferential groove has a smaller external cross-section than the securing ring and minimum diameter less than the said one portion of the minimum diameter surface, wherein the preform has a constant interior diameter adjacent a level of the thread, wherein an internal diameter of the preform is reduced at the level of the securing ring, wherein a side wall of the securing ring forms a boundary wall of the groove, wherein the inner wall of the container preform has below the circumferential securing ring a section that has a constant interior diameter and a section which widens conically towards the thread, wherein the base body has an internal diameter which widens at a point adjacent the circumferential groove as one progresses upward from the circumferential securing ring, and wherein, besides the securing ring, no further ring exists between the thread and the securing ring.

* * * * *